J. L. BANDELOT.
Beer Cooler.
No. 25,992. Patented Nov. 1, 1859.
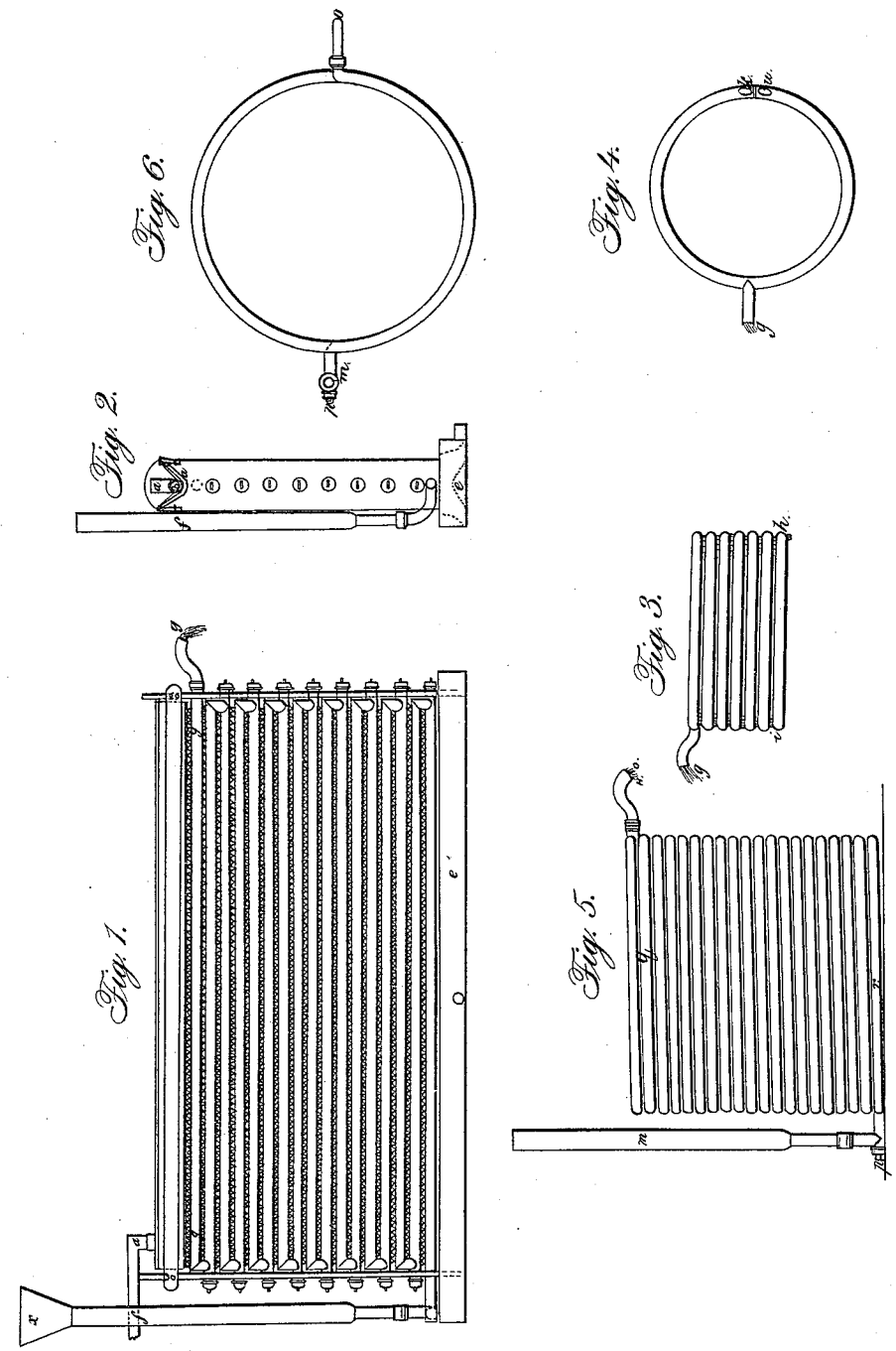
Witnesses:
Inventor:

UNITED STATES PATENT OFFICE.

JEAN LOUIS BAUDELOT, OF HARANCOURT, FRANCE, ASSIGNOR TO HENRY MIGEON.

APPARATUS FOR COOLING LIQUIDS.

Specification forming part of Letters Patent No. 25,992, dated November 1, 1859; Reissued January 28, 1862, Nos. 1,265, 1,266, and 1,267.

*To all whom it may concern:*

Be it known that I, JEAN LOUIS BAUDELOT, of Harancourt, subject of the Empire of France, have invented a new and Improved Refrigerator for Cooling Beer and other Liquids; and I do hereby declare that the following is a full and exact description thereof, reference being had to the accompanying drawing, and to letters of reference marked thereon, wherein—

Figure 1, is a side elevation of my cooling apparatus. Fig. 2, is an end view of the same. Fig. 3, is a side view and Fig. 4, is a plan showing a circular range of pipes which may be substituted for the flat range shown in Figs. 1 and 2. Figs. 5 and 6, represent a pipe in a coiled or helical form for the same purpose.

My refrigerator consists in a set of tubes, placed horizontally one above another, to the number of seventeen, and connected and communicating together by one of their ends, as shown by Fig. 1; but I am not limited by any number of tubes, nor by their length, size, or diameter, nor by any particular mode or manner of construction of the said refrigerator, as the same may be made or constructed of any size or form, according to requirements, and yet produce the same effect.

My invention consists in speedily cooling beer or any other liquids, nearly to the degree of the cooling water used at any season of the year by forcing cold water to run up from the bottom to the top in the inside of the tubes, and the hot beer or liquid falling on the exterior surface from the top to the bottom, or by the same apparatus with the water and beer transposed in position.

The said refrigerator when made is placed in an upright position and can be made of either copper, zinc, or any other suitable metal, as aforesaid. The said tubes are superposed over each other, at about a quarter of an inch apart from one another, while each tube is provided with a plug at each end, which may be taken out for the purpose of cleaning the inside. At the underside of each tube, in the center and over its entire length, is soldered a thin blade of the same metal. The said blade is made in the form of teeth, or of a saw, so as to serve as a conductor for the liquid falling successively from one tube to the other. From the kettle or boiler, or from any other vessel, the said beer or liquid in the hot or boiling state passes into the tube $a$. This tube, provided with large holes ($b$), distributes the beer or liquid over its whole length, from where it falls into a trough $d$, the bottom of which, is made of very fine wire gauze ($c$) in order to retain the scum or loose hops, &c. This trough is situated in the interior of another one, perforated at the bottom over its whole length with a row of small holes, near and directly over the top of the first refrigerator tube ($y$), and divides the beer or other liquids uniformly over the exterior surface of the first tube, from whence the liquid falls on the next one, and so on from one tube to the other down to its base, where it arrives cooled into a large trough $e$, in which stands the said refrigerator.

Connected with the lowest or bottom tube of the said refrigerator, is an upright tube $f$, or leader, a little more elevated than the said refrigerator; into which is introduced the cold water, the pressure of which forces the same to run up from tube to tube to the top and last one, whence it comes out, as shown by $g$, and will have become hot by having abstracted from the beer or other liquids the superfluous heat.

It will be apparent that the pipes shown in Figs. 3, 4, 5, and 6, may be used in connection with the distributing pipe $a$, and trough $d$, when made in a circular form to correspond, although I prefer the apparatus shown in Figs. 1 and 2.

From the foregoing it will be seen that a very thin stratum of beer or other liquid is running over the surface of the pipes and dripping from one to the other, thereby exposing a large area for the vapors to pass away as the cooling progresses; and this in conjunction with the speed of the cooling operation renders the quality of the beer far superior to that cooled by any previous apparatus. It will also be evident that in this apparatus the peculiar advantage is gained over others heretofore used, that the circulation of the water when heated is avoided, or, in other words, that the beer falling on the upper pipes in a hot state trickles down over a surface that finally is cold, and from that the beer passes away, (and the same effect is produced when the beer is within the pipes and the water trickling over,) whereas in other instances the circulation induced in a mass of liquid that has heretofore surrounded said pipes, has prevented the perfect transfusion of the heat from the beer to the water.

Having thus described my said invention, I do not claim a worm or pipe into which the water passes at the bottom and escapes at the top, when such pipes are immersed in a vat or tun containing liquid to be cooled; neither do I claim passing the cooling water in the opposite direction to the beer, when the latter runs in channels or on an inclined surface; but

What I claim as my invention, and desire to secure by Letters Patent, is—

1. A cooling apparatus for liquids composed of a vertical range of pipes passing the liquid successively from the lower to the upper pipes in said range, in combination with the perforated trough ($d$,) or its equivalent, supplying the other liquid which trickles over the surface of said range of pipes, as set forth.

2. I also claim, in such a cooling apparatus, a series of teeth or projections on the under sides of the horizontal pipes for the purpose of conducting or distributing the liquid falling successively from one pipe to the other substantially as specified.

Sedan, twenty-third of April, 1859.

JEAN LOUIS BAUDELOT.

Witnesses:
JACQUES ANTOINE,
LÉOPOLD DESIRÉ DENISON.